Sept. 27, 1966  A. O. RADKE ETAL  3,275,372
SEAT STRUCTURE
Filed Sept. 9, 1964  7 Sheets-Sheet 1
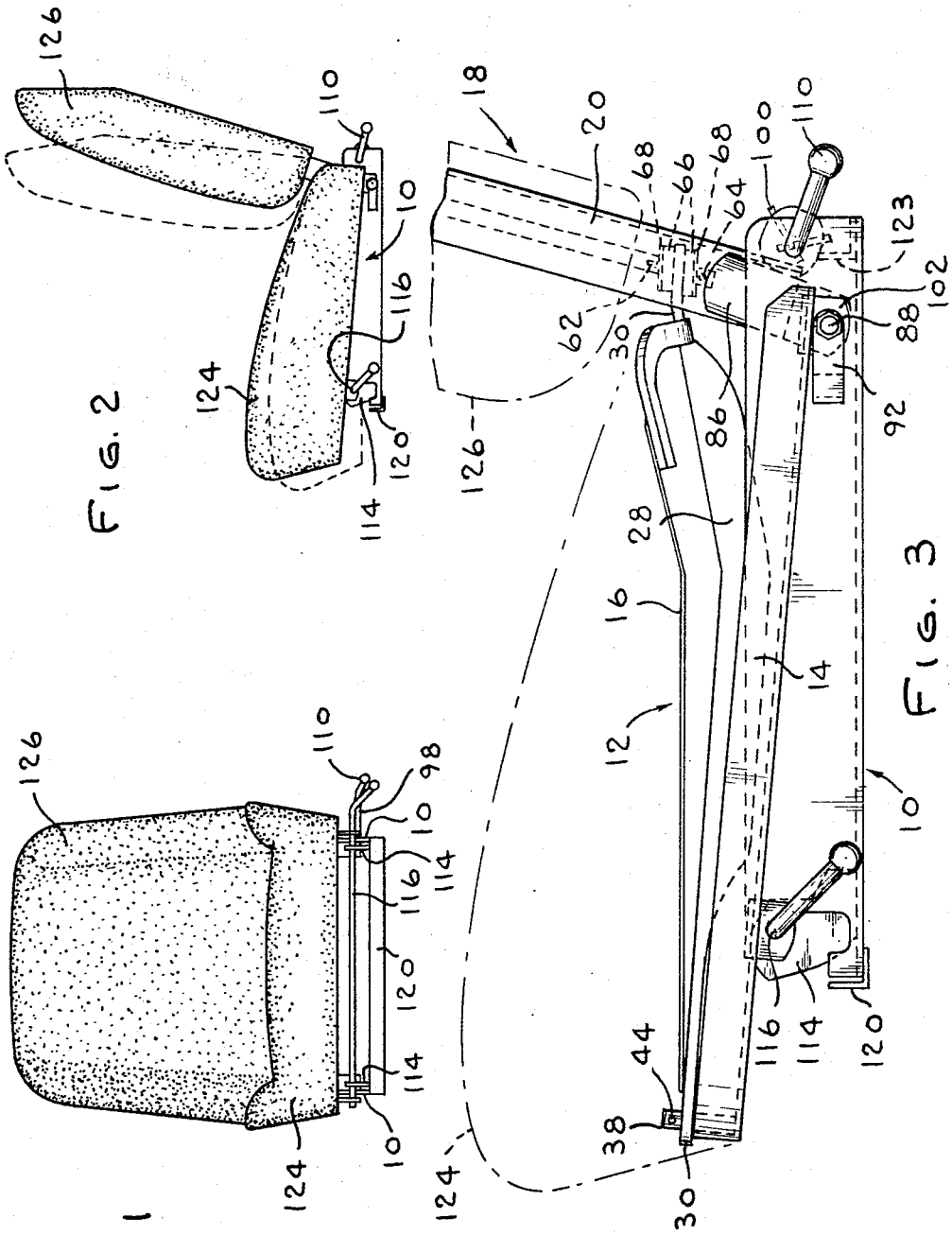
INVENTORS
ARTHUR O. RADKE
WILLIAM C. OSWALD
JOSEPH A. CHAMPA
BY Bayard H. Michael
ATTORNEY

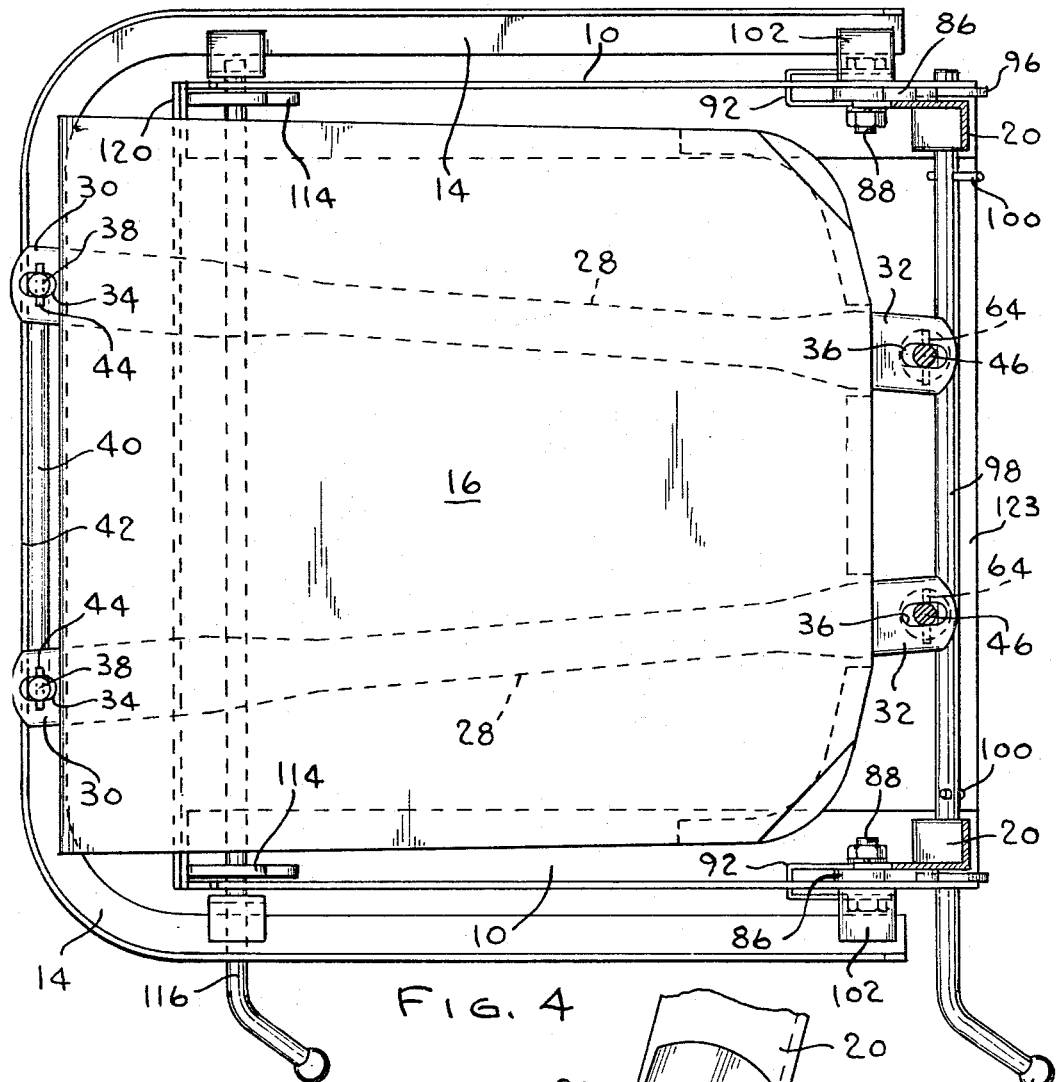
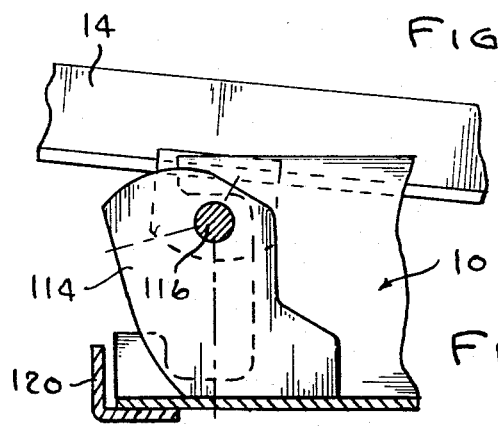
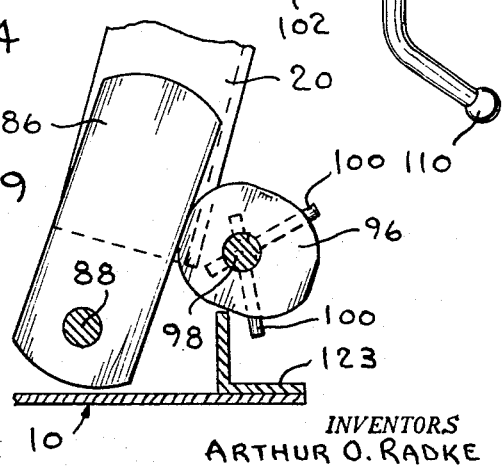

Sept. 27, 1966 A. O. RADKE ETAL 3,275,372
SEAT STRUCTURE
Filed Sept. 9, 1964 7 Sheets-Sheet 3
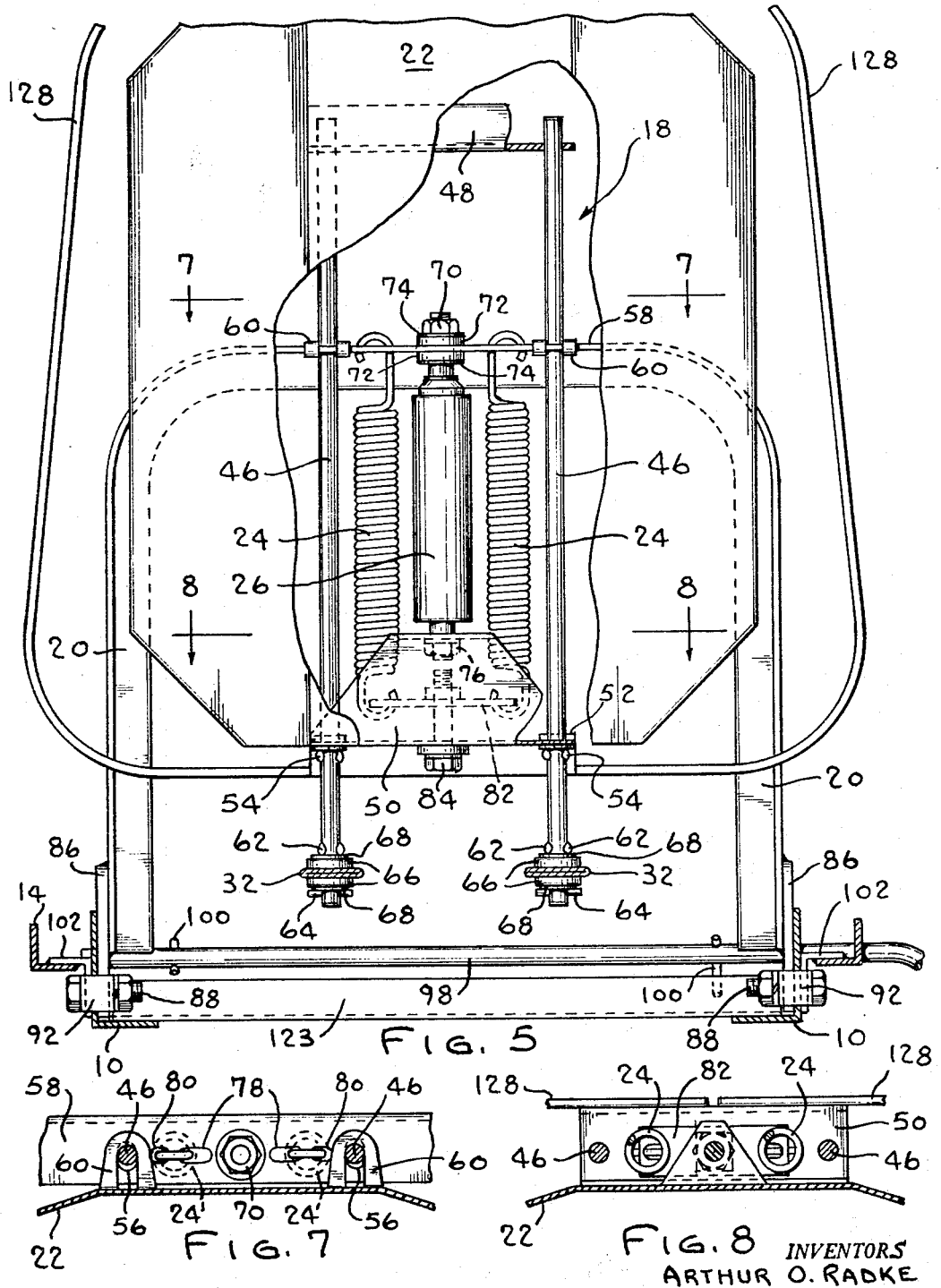
INVENTORS
ARTHUR O. RADKE
WILLIAM C. OSWALD
JOSEPH A. CHAMPA
BY Bayard H. Michael
ATTORNEY

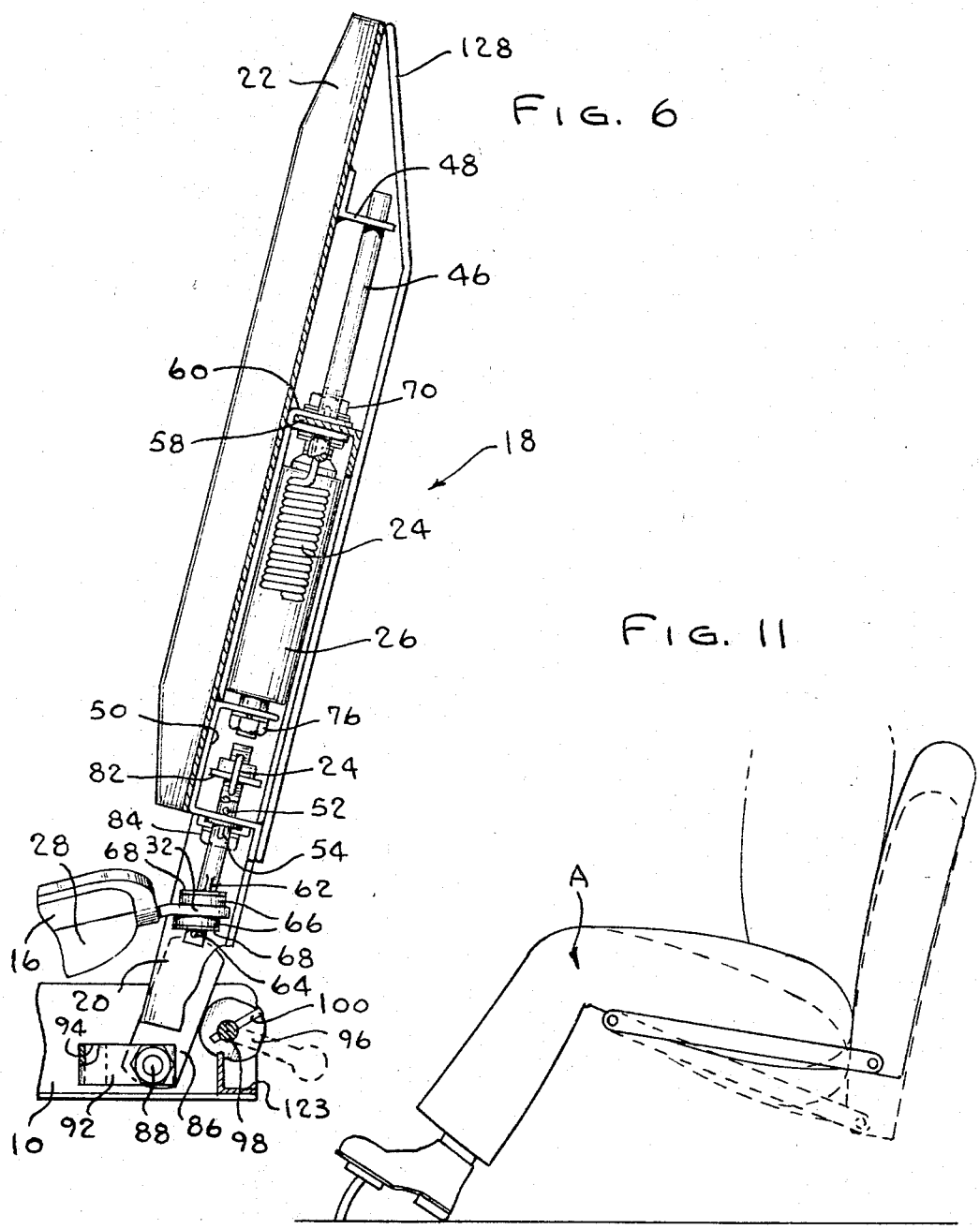

INVENTORS
ARTHUR O. RADKE
WILLIAM C. OSWALD
JOSEPH A. CHAMPA
BY Bayard H. Michael
ATTORNEY Sept. 27, 1966     A. O. RADKE ETAL     3,275,372
SEAT STRUCTURE Filed Sept. 9, 1964     7 Sheets-Sheet 6

INVENTORS
ARTHUR O. RADKE
WILLIAM C. OSWALD
JOSEPH A. CHAMPA
BY Bayard H. Michael
ATTORNEY

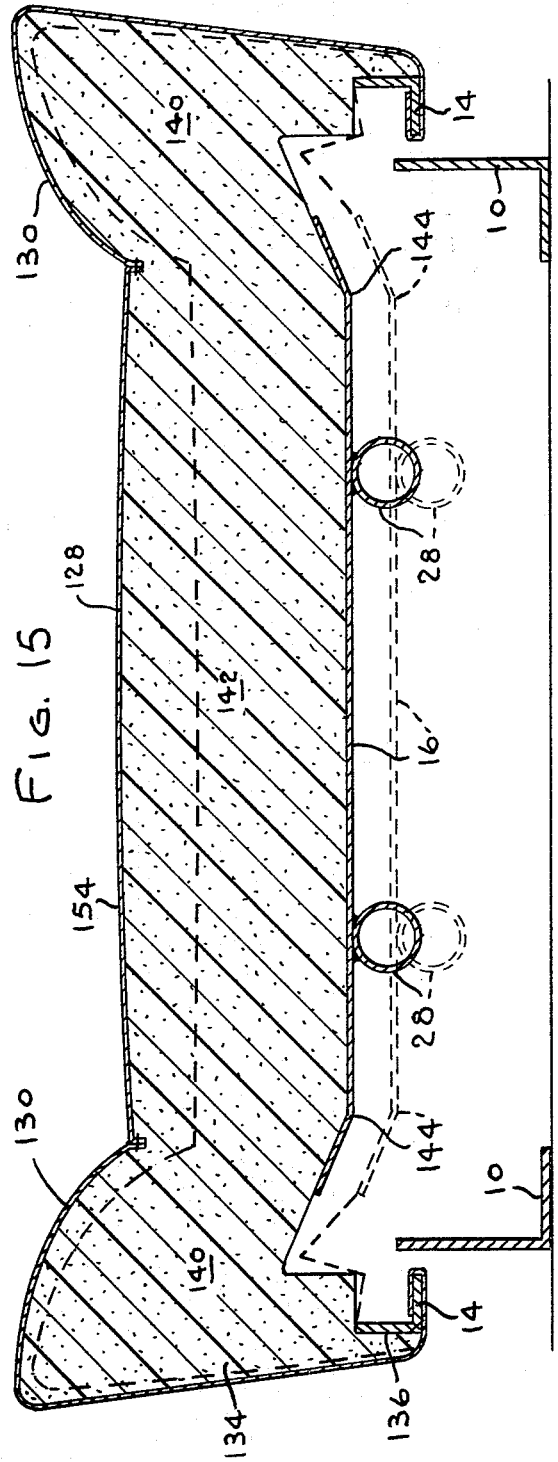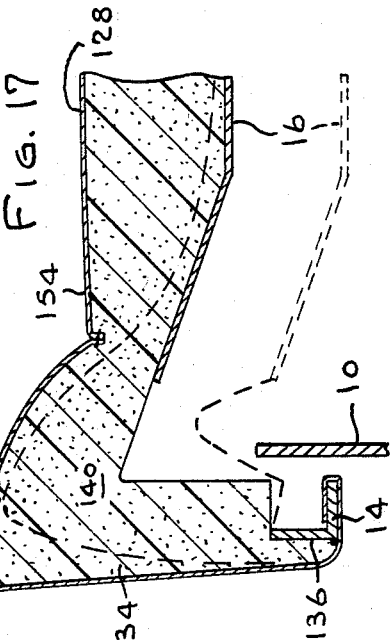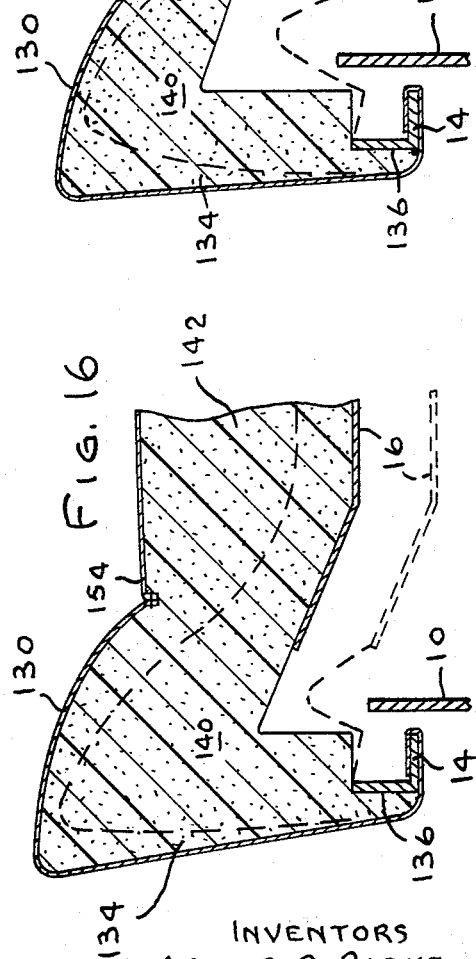

United States Patent Office 3,275,372
Patented Sept. 27, 1966

3,275,372
SEAT STRUCTURE
Arthur O. Radke and William C. Oswald, Wauwatosa, and Joseph A. Champa, Milwaukee, Wis., assignors to Bostrom Corporation, Milwaukee, Wis., a corporation of Wisconsin
Filed Sept. 9, 1964, Ser. No. 395,200
8 Claims. (Cl. 297—285)

This invention pertains to improvements in seat cushions and more particularly to the novel utilization of the cushioning material of dynamically isolated seats.

An important object of this invention is to utilize the cushioning material of a seat to provide improved static as well as dynamic isolation characteristics of the seat.

This object is attained by providing a base member and a seat pan movable in respect to the base member and by connecting a resilient cushion (as a polyurethane foam) between the seat pan and the base member so that upon occupancy of the seat part the cushion material is loaded in compression and provides static comfort for the occupant and part thereof is loaded in shear and provides dynamic isolation for the occupant.

Another important object of this invention is to utilize the cushioning material of a seat in combination with other spring means of the seat suspension in the dynamic isolation of the seat in order to obtain improved dynamic isolation characteristics as well as to render the seat compact in size and light in weight.

This object is attained by providing spring means in parallel with that section of the resilient cushioning material which biases a seat pan away from the seat frame. Because the cushioning material bears part of the load normally borne by the springs, the size and/or number of the latter may be reduced to attain the desired compactness. Further, cushioning materials generally have damping characteristics and, therefore, provide the highly desirable ride characteristics normally obtained with a suspension employing parallel spring and damping means. Separate damping means, such as a shock absorber, may be employed in parallel with the cushioning material and the spring means to further improve the ride characteristics of the seat. Other features of this combination particularly contributing to the compactness of the seat will be better appreciated from that part of the specification in which the preferred embodiment of our invention is described in detail.

A further important object of this invention is to utilize the cushioning material in the dynamic isolation of an occupant-weight adjustable seat without impairing the static isolation characteristics of the cushioning material by the weight adjustment of the dynamic suspension.

This object is attained by the provision of a separate section of the cushioning material which contributes to the dynamic isolation of the seat and a separate section which contributes to the static isolation. Because of this feature, weight adjustment means may be provided which will only affect the former section.

Other objects and advantages will be pointed out in, or be apparent from the specification and claims, as will obvious modifications of the single embodiment shown in the drawings, in which:

FIG. 1 is a front view of a vehicle seat embodying the present invention;

FIG. 2 is a side view of the seat shown in FIG. 1 and showing the seat and back cushion in adjusted position in dashed lines;

FIG. 3 is a side view of the seat pan assembly, with a fragment of the back pan assembly being shown;

FIG. 4 is a top view of the seat pan assembly;

FIG. 5 is a front view of the back pan assembly with a portion of the back pan being broken away to show the springs and the shock absorber;

FIG. 6 is a cross-sectional side view of the back pan assembly, with a fragment of the seat pan assembly being shown;

FIG. 7 is a view taken on line 7—7 of FIG. 5;

FIG. 8 is a view taken on line 8—8 of FIG. 5;

FIG. 9 is a detail view of the back cushion adjustment cam;

FIG. 10 is a detail view of the seat cushion adjustment cam;

FIG. 11 is a schematic view showing the effect of a seat of the type disclosed herein upon the legs of its occupant;

FIG. 15 is a cross-sectional view taken on line 15—15 of FIG. 14 with a depressed seat position being indicated in broken lines;

FIG. 16 is a fragmentary cross-sectional view taken on line 16—16 of FIG. 14; and FIG. 17 is a fragmentary cross-sectional view taken on line 17—17 of FIG. 14.

Figure 12:
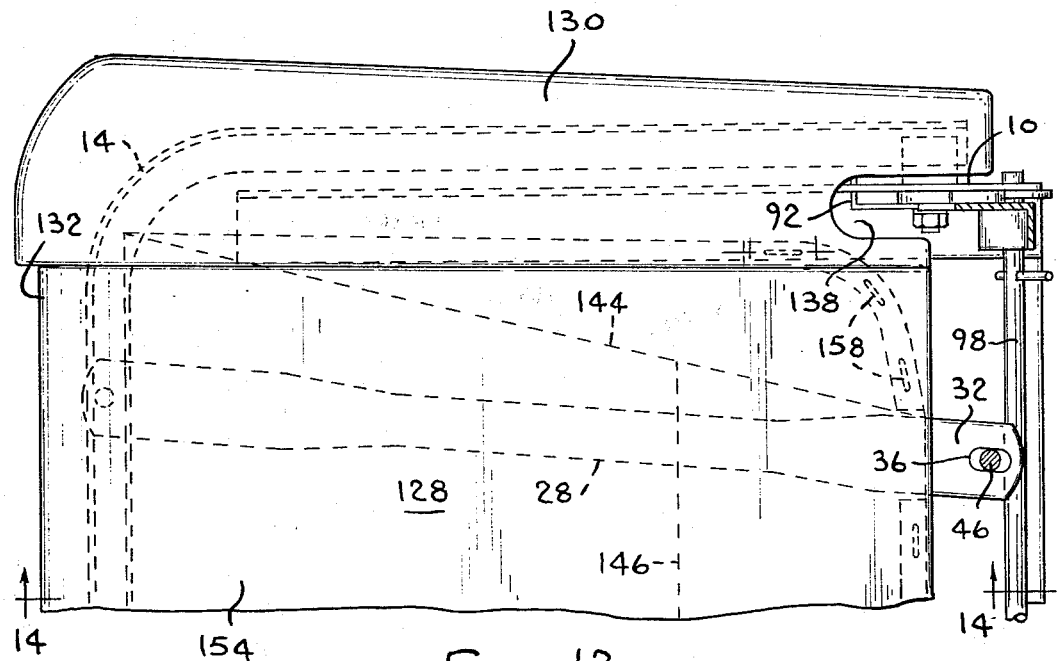
FIG. 12 is a fragmentary top view of the seat and its seat cushion.
Figure 13:
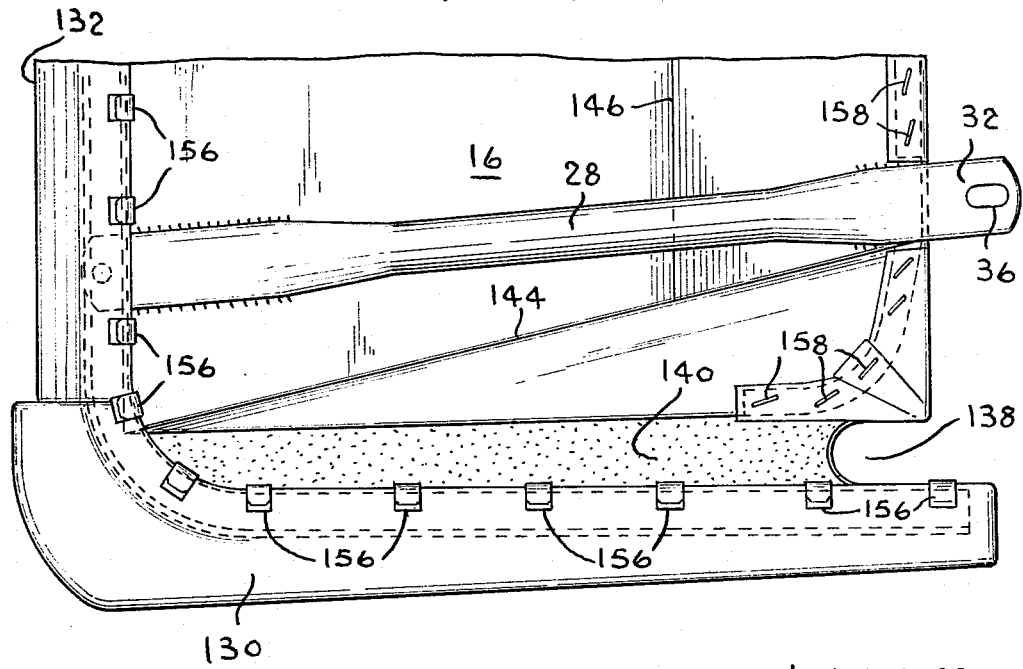
FIG. 13 is a bottom view of the structure shown in FIG. 12.
Figure 14:
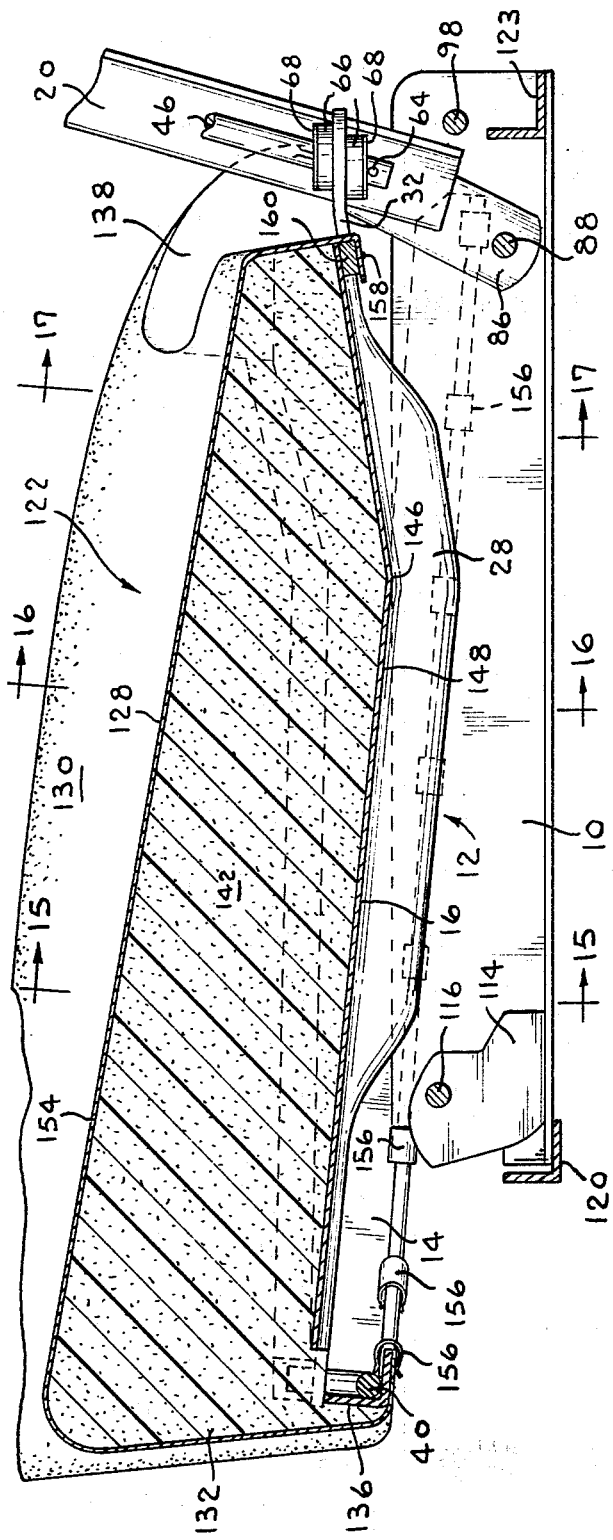
FIG. 14 is a cross-sectional view taken on line 14—14 of FIG. 12.

It is believed that the cooperation between the seat cushion and its framework assembly will be best understood by first referring to FIGS. 1–11 which are directed to such assembly.

The drawings show a vehicle seat having normal seat cushion depth, in effect such that the occupant's knees rest substantially at the front edge of the seat cushion as indicated at A in FIG. 11. The basic components of the frame work are a mounting frame 10 which is adapted to be secured either adjustably or permanently to a vehicle, a seat frame assembly 12 comprised of a seat frame 14 pivotally secured to the mounting frame, and a seat pan 16 pivotally secured at its front edge to the seat frame, and a back frame assembly 18 which is comprised of a back frame 20 pivotally secured at its lower end to the mounting frame 10 and a back pan 22 mounted for slidable movement in respect to the back frame and pivotally secured at its bottom edge to the seat pan 16. The structure is in part resiliently supported by two coil springs 24 which cooperate with a shock absorber 26 to contribute to the vibrational isolation and damping of the seat.

The seat pan is provided with two tubular support members 28 which have flat tabs 30 and 32 extending over the front and back edges of the pan respectively. Tabs 30 are provided with elongated slots 34 and tabs 32 are provided with elongated slots 36. The slots 34 receive upstanding ends 38 of a U-shaped pan support rod 40 which is welded to the seat frame 14. The tabs are engaged by flange 42 of the seat frame and by pins 44 provided in the ends 38. This type of connection fixes the seat pan in respect to the seat frame, however, permits limited pivotal motion of the pan around its front edge. The slots 36 receive back pan guide rods 46, and are also secured thereto for pivotal motion. It is of note that the slot-pin type of connections of the seat pan to the seat frame and back pan provides some fore and aft clearance for the ends of rod 40 and rods 46. This clearance could be provided at only one of the pivotal connections of the seat pan, however, some clearance is necessary to attain the above described motion of the seat pan.

The back pan 22 is mounted for limited lineal motion in the plane of the back frame 20 by means of guide rods 46 which are attached to the back pan by an upper bracket 48 and a lower shock absorber bracket 50. Both brackets are welded to the back pan. The rods are welded to the upper bracket and fixed to the shock absorber bracket by pins 52 and nibs 54. They pass through slots 56 in the flange 58 of the back frame and are engaged by nylon liners 60 which serve to provide a suitable bearing surface for the rods. The lower ends of the rods are secured to the tabs 32 of the seat pan by means of nibs 62 and pin 64 which serve to retain resilient washers 66 on both sides of the tabs. To avoid undue wear of the washers, flat steel washers 68 are provided on their outside surfaces. It is seen that the back pan and the seat pan are assembled for unitary motion wherein the seat pan will pivot around its front edge, and thus impart motion by means of the rods 46 to the back pan, which will move in the plane of the back frame 20.

The shock absorber 26 is secured to the flange 58 by means of a nut 70, resilient washers 72, and flat steel washers 74, and to the shock absorber bracket 50 by another nut 76. A pair of coil tension springs 24 are secured in suitable apertures 78 and 80 in the flange 58 of the back frame and are connected to a spring adjustment bracket 82 which is adjustably secured to the shock absorber bracket 50 by means of bolt 84. As best seen from FIG. 5, the bolt can be adjusted to vary the relative position of the spring adjustment bracket in relation to the back frame and to thereby vary the preload of the springs 24. As is well known in the art, such preload has to be adjusted in order to adapt the seat for various loads and/or road conditions.

A foot 86 is welded to each end of the back frame which is pivotally secured to the mounting base by hinge pins 88. A clip 92 is passed through an aperture 94 in the mounting frame and provides a seat for the head of the hinge pin and nut 90, thereby preventing the nut from being loosened because of the motion between the seat and back frames. The back frame is retained in the rearwardly inclined position by back adjustment cams 96, which engage the foot 86. The cams are secured to a rod 98 which is carried for rotation by the mounting base 10. The rod is provided with two stop pins 100 by means of which the cam can be positioned in three separate stations to thereby vary the angle of the back frame. A suitable knob 110 is provided for this purpose.

The seat frame 14 is also pivotally secured to the mounting frame 10 by hinge pin 88 which engages a rear pivot bracket 102 of the seat frame. The position of the seat frame in respect to the mounting base is controlled by the seat adjustment cam 114. This cam is provided with a contour which permits the adjustment of the seat frame to several frontwardly inclined positions. It is of note that both the adjustment of the back frame assembly, as well as of the seat frame, does not in any way affect the suspension of the seat pan 12 nor the back pan 22, nor in any way affects the position and the effect of the shock absorber 26 and springs 24 on the seat structure.

The mounting frame 10 has a front cross channel 120 and rear cross channel 123, which channels serve as stiffening members for the frame. The seat and back pan assemblies are encased in suitable resilient cushions 124 and 126 respectively.

The structure so far described in reference to FIGS. 1–11 is disclosed in our co-pending application Serial No. 287,634, filed on June 13, 1963.

The seat cushion 122 is made of polyurethane foam which may be cast to the desired final form of the cushion. The cushion's top surface has a generally flat main support area 128 and two bolsters 130 on each side thereof. The front and side cushion sections 132 and 134 extend sufficiently downwardly to cover the outer face of the U-shaped seat frame 14 and are bonded thereto at an inwardly facing and similarly shaped surface 136. Since the seat frame 14 is directly connected to the vehicle and experiences the vibrations thereof, it may be considered as a base member for the seat cushion. The seat pan 16 is bonded to the bottom face of the cushion. The back of the cushion is provided with two U-shaped cutouts 138 to provide clearance for the back frame 20 when it is tilted forwardly. Because the seat cushion is fixed to the seat frame as well as the narrower seat pan, the cushion sections 140 intermediate the pan and the frame will be dynamically loaded in shear during the relative movement between these parts and will thereby provide damping as well as vibrational isolation to the occupant of the seat. The type of loading of cushion sections 140 is shown in FIGS. 15–17 in which they are shown in cross-section at points progressively closer to the back of the seat and, therefore, showing a corresponding increase in deformation.

The central section 142 of the seat cushion defines the main support area 128. Its bottom surface is of a contour corresponding to the shape of the seat pan 16 which is bent at 144 and 146 to form a generally flat central portion 148 and upwardly inclined side and rear portions 150 and 152. When the seat is occupied, section 142 is compressed against the seat pan and deforms to provide the cushioning requisite for a statically comfortable seat. The inclined portions of the pan limit the lateral deformation of this cushion section and in combination with the bolsters 130 provide a properly cushioned lateral support for the occupant. It should be noted that since the loading of section 142 is substantially independent of the dynamic loading of the seat and of the height as well as preload adjustments, the comfort of the seat will always be maintained at its predetermined level.

The seat cushion is encased in a cover 154 which is fixed at the front and sides of the cushion to the inwardly extending flange of the seat frame 14 by clips 156 and at the back to the seat pan 16 by staples 158 which project into fibrous rim 160 of the pan. It is of note that the seat cover also aids in maintaining the seat cushion fixed to the seat frame and plan.

Although but a single embodiment of the present invention has been illustrated and described, it will be apparent to those skilled in the art that various changes and modifications may be made therein without departing from the spirit of the invention or from the scope of the appended claims.

We claim:

1. A seat cushion comprising, a base member, a seat pan mounted for relative movement in respect to said base member, resilient foam means fixed to said base and to the top of said seat pan to affect said relative movement as well as to provide static cushioning to an occupant of the seat, and spring means in parallel with said resilient foam means and cooperating therewith to vibrationally isolate said seat pan from the vibrations experienced by said base member.

2. A seat cushion comprising, a base member, a seat pan mounted for relative movement in respect to said base member, resilient cushioning means having a first section extending over and fixed to the top surface of said seat pan to provide cushioning to the occupant of the seat, said cushioning means having a second section extending laterally from said first section and being connected to said base member and said seat pan to affect said relative movement, and spring means in spaced relationship in respect to said second section and connected to said base member and to said seat pan to cooperate with said cushioning means to vibrationally isolate said seat pan from the vibrations experienced by said base member.

3. A seat cushion comprising, a base member, a seat pan mounted for relative movement in respect to said base member, resilient cushioning means having a first section extending over and fixed to the top surface of the seat pan to provide cushioning to the occupant of the seat, said cushioning means having a second section extending between said base member and said seat pan and being connected to said seat pan and said base member to be loaded in shear upon occupancy of the seat and to thereby provide vibrational isolation to the seat pan.

4. A seat cushion comprising, a base member, a seat pan mounted for relative movement in respect to said base member, said base member having two opposite sides each of which is spaced outwardly from one of two opposite sides of said seat pan, a resilient foam cushion connected to said opposite base member sides and extending over and being connected to the top surface of said seat pan to thereby provide static as well as dynamic isolation characteristics to the seat cushion.

5. A seat cushion according to claim 4 including pivotal connecting means securing said seat pan to said base member for pivotal motion around a side of said seat pan which side is intermediate said two opposite sides of said seat pan.

6. A seat cushion according to claim 5 including spring means which are connected to said base member and are connected to said seat part intermediate said two opposite sides to exert a bias on said seat pan in a direction away from said base member.

7. A vehicle seat comprising, a base member, a seat pan mounted for relative movement in respect to said base member, resilient foam means fixed to said seat pan and said base member to affect said relative movement, a back member extending generally upwardly from said base member, and spring means extending in the plane of said back member and being connected to said seat pan and to said base member to act in parallel with said foam means in isolating the seat from the vibrations experienced by said base member.

8. A vehicle seat comprising, a base member, a seat pan pivotally mounted at its front to said base member, said base member having two side portions which are laterally spaced in respect to opposite sides of said seat pan, resilient foam means fixed to the top surface of said seat pan to provide cushioning to the occupant of the seat and extending beyond said sides of said pan and being fixed to said two base side portions to provide two foam means sections which are loaded in shear upon relative movement between said pan and base member, a back member extending generally upwardly from said base member, and spring means extending in the plane of said back member and being connected to said seat pan and said base member to act in parallel with said two foam means sections in isolating the seat from the vibrations experienced by said base member.

References Cited by the Examiner

UNITED STATES PATENTS

| 1,231,914 | 7/1917 | Kunkel | 297—455 |
| 2,177,363 | 10/1939 | Flint | 297—301 |
| 2,562,041 | 7/1951 | Keller | 297—301 X |
| 2,981,317 | 4/1961 | Cartwright et al. | 297—427 |
| 3,142,515 | 7/1964 | Wall et al. | 297—452 |

FRANK B. SHERRY, *Primary Examiner.*

CASMIR A. NUNBERG, *Examiner.*

R. B. FARLEY, *Assistant Examiner.*